(12) United States Patent
Campagna

(10) Patent No.: US 7,657,456 B2
(45) Date of Patent: Feb. 2, 2010

(54) METHOD AND SYSTEM FOR ELECTRONIC VOTING USING IDENTITY BASED ENCRYPTION

(75) Inventor: Matthew J. Campagna, Ridgefield, CT (US)

(73) Assignee: Pitney Bowes Inc., Stamford, CT (US)

( * ) Notice: Subject to any disclaimer, the term of this patent is extended or adjusted under 35 U.S.C. 154(b) by 594 days.

(21) Appl. No.: 11/083,527

(22) Filed: Mar. 18, 2005

(65) Prior Publication Data

US 2006/0229991 A1    Oct. 12, 2006

(51) Int. Cl.
*G06F 11/80* (2006.01)
*G07C 13/00* (2006.01)

(52) U.S. Cl. .......................................... 705/12; 705/67
(58) Field of Classification Search ............... 705/50–79
See application file for complete search history.

(56) References Cited

U.S. PATENT DOCUMENTS

| | | | | |
|---|---|---|---|---|
| 6,971,574 | B1 * | 12/2005 | Herskowitz | 235/386 |
| 7,003,117 | B2 * | 2/2006 | Kacker et al. | 380/277 |
| 7,113,594 | B2 * | 9/2006 | Boneh et al. | 380/28 |
| 2002/0083126 | A1 * | 6/2002 | Best et al. | 709/203 |
| 2003/0081785 | A1 | 5/2003 | Boneh | |
| 2005/0044413 | A1 * | 2/2005 | Elms et al. | 713/201 |

OTHER PUBLICATIONS

Boneh, D. and Franklin, M.; "Identity-Based Encryption from the Weil Pairing," SIAM Journal of Computing, vol. 32, No. 3, pp. 586-615, 2003.

* cited by examiner

*Primary Examiner*—Andrew J. Fischer
*Assistant Examiner*—Thomas C. West
(74) *Attorney, Agent, or Firm*—Brian A. Lemm; Angelo N. Chaclas

(57) ABSTRACT

A voting method includes receiving identity-based information, vote data and a passphrase for a voter, encrypting the vote data using a symmetric key, generating second identity-based information for the voter, and generating an identity-based public key using at least the second identity-based information and a voting system parameter. The symmetric key is encrypted using the identity-based public key and an identity-based asymmetric encryption algorithm. The encrypted symmetric key may be decrypted using a private key corresponding to the identity-based public key and an identity-based asymmetric decryption algorithm, wherein the private key is generated from at least the identity-based public key and a secret master key. The voter is provided with information that includes at least the encrypted vote data and the encrypted symmetric key, and the system retains anonymous identity information, encrypted vote data and the encrypted symmetric key as a paper audit trail.

9 Claims, 1 Drawing Sheet

METHOD AND SYSTEM FOR ELECTRONIC VOTING USING IDENTITY BASED ENCRYPTION

FIELD OF THE INVENTION

The present invention relates to electronic voting systems, and in particular to an electronic voting system that utilizes an identity based encryption scheme to provide a paper audit trail.

BACKGROUND OF THE INVENTION

Most conventional voting systems in place around the world utilize either paper ballots or mechanical voting booths having mechanical switches and levers that, when actuated, increment a plurality of mechanical counters. These conventional systems present a number of problems for election processes. For example, paper ballots can become physically damaged or altered between the time the voter makes his or her selection and the time a ballot-counting machine eventually reads the voter's selection on the ballot. In addition, with paper ballots, voters can inadvertently cast a vote for the wrong candidate by, for example, punching a hole or placing an X next to a different candidate than was intended. Mechanical voting booths, while solving some of the problems presented by paper ballots, present problems of their own. For instance, voting booths are fairly expensive, have many mechanical parts which require routine maintenance and repair, and are typically heavy and cumbersome to move and set up.

More recently, electronic voting systems have been developed with an eye toward solving the problems presented by systems that employ paper ballots and/or mechanical voting booths. However, none of the electronic voting systems developed to date has proven to be secure and efficient enough to result in the widespread use thereof (in place of existing paper ballot and/or mechanical voting booth systems). An emerging requirement of any electronic voting system is to provide a paper audit trail. Many electronic voting systems give the voters a receipt by which they can prove how they voted. Such receipts, however, provide a ready means by which voters can prove how they voted to third parties, thereby allowing voters to easily sell or trade their votes. Thus, there is a need for an electronic voting system that is secure and efficient and provides a paper audit trail that protects against the potential of vote selling/trading.

SUMMARY OF THE INVENTION

The present invention relates to an electronic voting system that employs a method of recording votes that utilizes an identity-based encryption (IBE) scheme to make the method private, secure and efficient and that prevents vote selling/trading. The method includes receiving identity-based information, such as one or more of a name, a mailing address, an e-mail address, a social security number, a telephone number, or an office address, for a voter, receiving vote data for the voter (i.e., the votes they have cast), and receiving a passphrase (preferably kept secret by the voter) for the voter. Preferably, each of these items of information is input by the voter into a computer system provided at a polling location. The method further includes encrypting the vote data using a symmetric key, preferably generated by a computer system at the polling location, to create encrypted vote data. Then, an identity-based public key is generated, preferably by a two step process that includes generating second identity-based information for the voter using at least the received identity-based information and passphrase, and generating the identity-based public key using at least the second identity-based information and a voting system parameter maintained by the entity overseeing the voting process. The method then includes encrypting the symmetric key using the identity-based public key and an identity-based asymmetric encryption algorithm to create an encrypted symmetric key. The encrypted symmetric key may be decrypted using a private key corresponding to the identity-based public key and an identity-based asymmetric decryption algorithm corresponding to the identity-based asymmetric encryption algorithm, wherein the private key is generated from at least the identity-based public key and a secret master key using a private key generator algorithm. The voter is then provided with information, preferably on a paper voter receipt, that includes at least the encrypted vote data and the encrypted symmetric key. In the preferred embodiment, the method further includes retaining at least the encrypted vote data, the encrypted symmetric key, and the second identity-based information, such as on a piece of paper printed at the polling location, for later use by the entity overseeing the voting process.

In one particular embodiment, the step of generating the second identity-based information for the voter includes creating a hash of at least the identity-based information and the passphrase, and the step of generating the identity-based public key includes creating a hash of at least the second identity-based information and the voting system parameter.

In addition, the method may further include decrypting the encrypted vote data at a later time by: (i) recreating the identity-based public key from the second identity-based information and the voting system parameter, (ii) obtaining the private key corresponding to the identity-based public key using the identity-based public key, the secret master key and the private key generator algorithm, (iii) decrypting the encrypted symmetric key using the obtained private key and the identity-based asymmetric decryption algorithm to obtain the symmetric key, and (iv) decrypting the encrypted vote data to obtain the vote data using the obtained symmetric key. Also, the method may further include decrypting the encrypted vote data by: (i) receiving the identity-based information and the passphrase from the voter, (ii) recreating the second identity-based information using the identity-based information and the passphrase, (iii) recreating the identity-based public key from the second identity-based information and the voting system parameter, (iv) obtaining the private key corresponding to the identity-based public key using the identity-based public key, the secret master key and the private key generator algorithm, (v) decrypting the encrypted symmetric key using the obtained private key and the identity-based asymmetric decryption algorithm to obtain the symmetric key, and (vi) decrypting the encrypted vote data to obtain the vote data using the obtained symmetric key.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Figure 1:
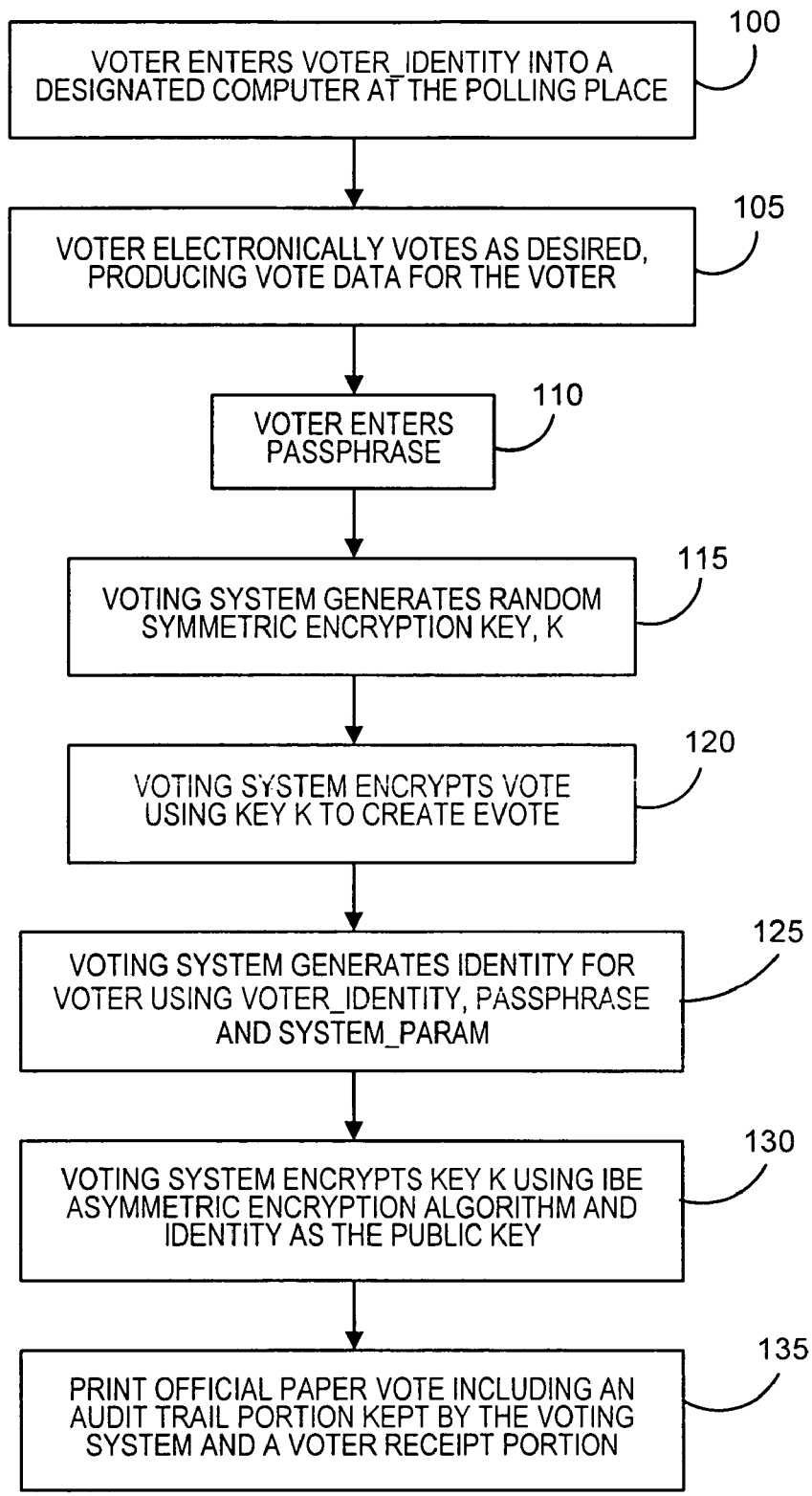
FIG. 1 is a flowchart illustrating the voting method that may be employed in an electronic voting system according to the preferred embodiment of the present invention.

Numerous public-key cryptosystems are known. Public-key cryptosystems allow two people to exchange private and authenticated messages without requiring that they first have a secure communication channel for sharing private keys. In a public-key cryptosystem, each person has a unique pair of keys: a private key that is a secret and a public key that is widely known. This pair of keys has two important properties: (1) the private key cannot be deduced from knowledge of the public key alone, and (2) the two keys are complementary, i.e., a message encrypted with one key of the pair can be decrypted only with the complementary key of the pair.

In one particular type of known public-key cryptosystem, a person's public key consists of a public identifier associated with the person, such as, without limitation, the person's name, street address, e-mail address, social security number, telephone number, office address, or any combination thereof. Because the public key is the person's pre-existing public identifier rather than a key produced from a random seed, this kind of public-key cryptosystem is called an identity-based encryption (IBE) scheme. IBEs are described in detail in U.S. Published Patent Application No. 2003/0081785 A1, the disclosure of which is incorporated herein by reference.

The present invention utilizes an identity-based encryption scheme to implement an easily deployed and secure electronic voting system. The preferred IBE utilized to implement the present invention is described in detail in the aforementioned U.S. Published Patent Application No. 2003/0081785 A1, although other similar IBE schemes may also be used. The preferred IBE scheme utilizes public keys that each consist of an arbitrary string derived from one or more identity related parameters (each such public key is referred to as the "identity" for the person in question). In addition, the IBE includes a private key generator entity that has knowledge of a secret master key (referred to herein as "master_key") and that utilizes a private key generator algorithm (referred to herein as "PKG") to generate a corresponding private key, referred to herein as "d," for each given public key (each given "identity"). This function is written as follows: d=PKG(identity, master_key). Furthermore, the IBE includes an asymmetric encryption algorithm, IEnc, and a corresponding asymmetric decryption algorithm, IDec, such that c=IEnc(m, identity) and m=IDec(c,d), wherein m is a given clear-text message and c is a corresponding ciphertext. This is done in such a way that for all m forming a part of a message space M, m=IDec(c, d), where c=IEnc(m, identity) and d=PKG(identity, master_key). In other words, the asymmetrical encryption algorithm, IEnc, and corresponding asymmetrical decryption algorithm, IDec, utilize the public/private key pairs described above ("identity" and "d") to encrypt and decrypt information.

In addition, each voter in the voting system of the present invention has a unique voter identity (referred to herein as "voter_identity"), such as, without limitation, a name and address within a voting district, a name and e-mail address, a social security number, a telephone number, an office address, or various combinations thereof, among others. Further, the invention utilizes a hash (preferably one-way) function, denoted as H, such as, without limitation, SHA-1, MD5 or any other known hashing algorithm, to create the public key, identity, for the voter using a two step process. In particular, each voter's public key, identity, is created as follows:

voter_anon_identity=H(voter_identity‖passphrase), identity=H(voter_anon_identity‖system_param), where system_param is a voting system parameter such as, for example, the voting system identification number along with a secret value, that is kept secret to the voting system (i.e, the entity overseeing the voting process), and passphrase is a character string (any combination of letters, numbers, symbols, etc.) kept secret by the voter. The identity for each voter will thus be kept secret to the extent they protect their chosen passphrase.

With these principles in mind, FIG. 1 is a flow chart that illustrates the implementation of the voting system according to the present invention. At step 100, the voter comes to the designated polling place and enters his or her unique voter_identity into a designated computer provided at the polling place. Next, at step 105, the voter electronically votes as desired by, for example, completing an electronic ballot, with the end result being a piece of data referred to as "vote." At step 110, the voter then enters his or her secret passphrase. At step 115, the voting system generates a random symmetric encryption key, k, for use with a known symmetric encryption algorithm, denoted as E, and corresponding symmetric decryption algorithm D. For example, such encryption algorithm may include, without limitation, 3DES or AES128 in CBC mode. As shown in step 120, the vote is encrypted to create an encrypted vote, denoted evote, using E and k, written evote=E(vote, k). Next, at step 125, the voting system generates identity (the public key) for the voter using voter_identity, passphrase, and system_param as described above. Once identity is created, the voting system, at step 130, encrypts the random key, k, using the asymmetric algorithm IEnc and the voter's identity, written as enc_k=IEnc(k, identity). The voting system then prints an official paper vote, as shown in step 135. Preferably, the official paper vote includes an upper portion that includes evote, enc_k, and voter_anon_identity (created during the generation of identity for the voter), and a lower portion that includes evote and enc_k. The upper portion is retained by the voting system personnel as a paper audit trail, and the lower portion is provided to the voter as a vote receipt.

The evote can be decrypted in two different ways. First, given evote, enc_k, and voter_anon_identity (which are contained on the upper portion of the official paper vote), the voting system can decrypt evote by: (1) creating identity for the voter as follows: identity=H(voter_anon_identity‖system_param); (2) obtaining the private key d that corresponds to identity (d=PKG(identity, master_key) (preferably the private key generator entity is the entity operating the voting system); (3) decrypting the enc_k using the just obtained private key d to obtain the secret key k (k=IDec (enc_k, d); and (4) decrypting evote to obtain vote using the just obtained key k (vote=D(evote, k)). Also, given evote and enc_k (which are contained on the lower portion of the official paper vote), the voter and the voting system together can decrypt evote. In particular, the voter provides his or her voter_identity and passpharase to the voting system, which in turn uses them to create voter_anon_identity (voter_anon_identity=H(voter_identity‖passphrase)). Once voter_anon_identity is created, then evote can be decrypted according to steps (1) through (4) above.

Thus, the voting system of the present invention provides several advantages. First, it provides a system in which each voter's vote is largely kept private, the only exception being the entity overseeing the voting system. Furthermore, although the entity overseeing the voting system has the ability to decrypt the encrypted vote, it is only able to associate that vote with a particular voter_anon_identity value and not any particular voter (as identified by voter_identity information). In other words, they cannot tell how each person cast their vote. As will be appreciated, this is the case because the hash algorithm used to create the public keys (identity) is preferably a one way hash algorithm. In addition, the system of the present invention prevents vote selling/trading because, while each voter is given a voter receipt, the voter receipt includes only encrypted vote data that can only be decrypted with the assistance of the entity overseeing the voting system. Also, each voter can later verify that there vote was cast in the way they intended by going to the entity overseeing the voting system and having the encrypted vote data decrypted in the manner described herein.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A voting method utilizing an electronic voting system including a computer system provided at a polling location, the method comprising:

receiving in said voting system identity-based information for a voter;

receiving in said voting system vote data for said voter;

receiving in said voting system a passphrase for said voter;

encrypting in said voting system said vote data using a symmetric key to create encrypted vote data;

generating in said voting system second identity-based information for said voter using at least said identity-based information and said passphrase;

generating in said voting system an identity-based public key using at least said second identity-based information and a voting system parameter;

encrypting in said voting system said symmetric key using said identity-based public key and an identity-based asymmetric encryption algorithm to create an encrypted symmetric key, wherein said encrypted symmetric key may be decrypted using a private key corresponding to said identity-based public key and an identity-based asymmetric decryption algorithm corresponding to said identity-based asymmetric encryption algorithm, and wherein said private key is generated from at least said identity-based public key and a secret master key using a private key generator algorithm; and providing from said voting system to said voter at least said encrypted vote data and said encrypted symmetric key.

2. The method according to claim 1, further comprising retaining at least said encrypted vote data, said encrypted symmetric key, and said second identity-based information in said voting system.

3. The method according to claim 1, wherein said step of generating said second identity-based information for said voter comprises creating a first hash of at least said identity-based information and said passphrase, and wherein said step of generating said identity-based public key comprises creating a second hash of at least said second identity-based information and said voting system parameter.

4. The method according to claim 1, wherein said providing step comprises printing a paper voter receipt to including said encrypted vote data and said encrypted symmetric key and providing said paper voter receipt to said voter.

5. The method according to claim 2, wherein said retaining step comprises retaining a piece of paper including said encrypted vote data, said encrypted symmetric key, and said second identity-based information.

6. The method according to claim 1, further comprising retaining at least said encrypted vote data, said encrypted symmetric key, and said second identity-based information, wherein said retaining step comprises retaining, as a paper audit trail, a piece of paper including said encrypted vote data, said encrypted symmetric key, and said second identity-based information.

7. The method according to claim 1, wherein said identity-based information includes one or more of a name, a mailing address, an e-mail address, a social security number, a telephone number, or an office address for said voter.

8. The method according to claim 2, further comprising decrypting said encrypted vote data by: (i) recreating said identity-based public key from said second identity-based information and said voting system parameter, (ii) obtaining said private key corresponding to said identity-based public key using said identity-based public key, said secret master key and said private key generator algorithm, (iii) decrypting said encrypted symmetric key using said obtained private key and said identity-based asymmetric decryption algorithm to obtain said symmetric key, and (iv) decrypting said encrypted vote data to obtain said vote data using the obtained symmetric key.

9. The method according to claim 2, further comprising decrypting said encrypted vote data by: (i) receiving said identity-based information and said passphrase from said voter, (ii) recreating said second identity-based information using said identity-based information and said passphrase, (iii) recreating said identity-based public key from said second identity-based information and said voting system parameter, (iv) obtaining said private key corresponding to said identity-based public key using said identity-based public key, said secret master key and said private key generator algorithm, (v) decrypting said encrypted symmetric key using said obtained private key and said identity-based asymmetric decryption algorithm to obtain said symmetric key, and (vi) decrypting said encrypted vote data to obtain said vote data using the obtained symmetric key.

* * * * *